(12) United States Patent
    Cook et al.

(10) Patent No.: US 10,992,734 B2
(45) Date of Patent: *Apr. 27, 2021

(54) REMOTING APPLICATION SERVERS

(71) Applicant: CenturyLink Intellectual Property LLC, Broomfield, CO (US)

(72) Inventors: Charles I. Cook, Louisville, CO (US); Kevin M. McBride, Lone Tree, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,368

(22) Filed: Feb. 28, 2019

(65) Prior Publication Data

US 2019/0199780 A1    Jun. 27, 2019

Related U.S. Application Data

(63) Continuation of application No. 14/730,695, filed on Jun. 4, 2015, now Pat. No. 10,225,327.
    (Continued)

(51) Int. Cl.
    *H04L 29/08*    (2006.01)
    *G06F 9/54*     (2006.01)

(52) U.S. Cl.
    CPC .............. *H04L 67/10* (2013.01); *G06F 9/547* (2013.01); *H04L 67/2819* (2013.01);
    (Continued)

(58) Field of Classification Search
    CPC ..... H04L 67/10; H04L 67/34; H04L 67/2819; G06F 9/547; G06F 2209/542; G06F 2209/549
    See application file for complete search history.

(56) References Cited

U.S. PATENT DOCUMENTS 6,182,275 B1 *  1/2001  Beelitz ................. G06F 8/63
                                                 717/175
6,427,150 B1 *  7/2002  Oashi .................. H04L 65/4076
                        (Continued)

FOREIGN PATENT DOCUMENTS

EP    2017711    1/2008
EP    2972859    1/2016
            (Continued)

OTHER PUBLICATIONS

EP Patent App. No. 14768226.4; Supplementary European Search Report dated Nov. 29, 2016; 10 pages.
(Continued)

*Primary Examiner* — Dhairya A Patel

(57) ABSTRACT

Novel tools and techniques might provide for implementing remote application access, and, in some cases, by instantiating an application or service close to the intended recipient or user of the application or service, from a networking perspective. A network might provide connectivity between a first computer and a second computer. A file (comprising an application and data) might be transmitted, over the network, from the first computer. A node in the network, which might be on a path between the first and second computers, might determine that the file contains the application and the data, and, based on such determination, might capture the file (before the second computer can receive it). An instance of the application might be instantiated on a compute surface in the network as a service for the second computer, such that the compute surface can operate on the data with the instance of the application.

17 Claims, 7 Drawing Sheets

Related U.S. Application Data

(60) Provisional application No. 62/037,096, filed on Aug. 13, 2014.

(52) U.S. Cl.
CPC ........ H04L 67/34 (2013.01); *G06F 2209/542* (2013.01); *G06F 2209/549* (2013.01)

(56) References Cited

U.S. PATENT DOCUMENTS

| | | | |
|---|---|---|---|
| 6,552,723 B1* | 4/2003 | Duluk, Jr. | G06T 1/60 345/419 |
| 6,560,641 B1* | 5/2003 | Powderly | G06F 9/544 707/999.01 |
| 6,577,327 B1 | 6/2003 | Rochford et al. | |
| 7,664,115 B1 | 2/2010 | Robotham | |
| 7,672,923 B1 | 3/2010 | Reed | |
| 7,693,079 B2 | 4/2010 | Cerami et al. | |
| 7,953,865 B1 | 5/2011 | Miller et al. | |
| 8,051,382 B1 | 11/2011 | Kingdom et al. | |
| 8,103,480 B2 | 1/2012 | Korn et al. | |
| 8,223,655 B2 | 7/2012 | Heinz | |
| 8,462,632 B1 | 6/2013 | Vincent | |
| 8,717,895 B2 | 5/2014 | Koponen et al. | |
| 8,750,288 B2 | 6/2014 | Nakil et al. | |
| 8,755,377 B2 | 6/2014 | Nakil et al. | |
| 8,881,142 B1 | 11/2014 | Reid | |
| 8,953,441 B2 | 2/2015 | Nakil et al. | |
| 8,959,185 B2 | 2/2015 | Nakil et al. | |
| 9,098,214 B1 | 8/2015 | Vincent et al. | |
| 9,141,416 B2 | 9/2015 | Bugenhagen | |
| 9,158,565 B2 | 10/2015 | Jakoljevic et al. | |
| 9,185,170 B1* | 11/2015 | Grammel | H04L 67/142 |
| 9,231,892 B2 | 1/2016 | Baphna | |
| 9,250,863 B1 | 2/2016 | Vincent et al. | |
| 9,356,883 B1 | 5/2016 | Borthakur | |
| 9,384,028 B1* | 7/2016 | Felstaine | H04L 45/586 |
| 9,386,001 B1 | 7/2016 | Marquardt et al. | |
| 9,417,902 B1 | 8/2016 | Noonan | |
| 9,430,259 B2 | 8/2016 | Bugenhagen | |
| 9,430,262 B1* | 8/2016 | Felstaine | H04L 67/16 |
| 9,495,188 B1 | 11/2016 | Ettema et al. | |
| 9,582,305 B2 | 2/2017 | Bugenhagen | |
| 9,628,294 B1 | 4/2017 | Brandwine | |
| 9,658,868 B2 | 5/2017 | Hill | |
| 9,703,598 B2 | 7/2017 | Vincent et al. | |
| 9,882,833 B2 | 1/2018 | McBride et al. | |
| 10,225,327 B2* | 3/2019 | Cook | G06F 9/547 |
| 10,409,625 B1* | 9/2019 | Suryanarayanan | G06F 8/656 |
| 2002/0152305 A1 | 10/2002 | Jackson et al. | |
| 2003/0055919 A1 | 3/2003 | Fong | |
| 2004/0015966 A1 | 1/2004 | Macchiano et al. | |
| 2005/0144288 A1 | 6/2005 | Liao | |
| 2005/0228921 A1 | 10/2005 | Sethi et al. | |
| 2006/0233144 A1 | 10/2006 | Matsumoto | |
| 2006/0235973 A1 | 10/2006 | McBride et al. | |
| 2007/0061433 A1 | 3/2007 | Reynolds | |
| 2007/0094085 A1 | 4/2007 | Redmond et al. | |
| 2007/0165818 A1 | 7/2007 | Savoor et al. | |
| 2007/0230358 A1 | 10/2007 | Narayanan et al. | |
| 2008/0002676 A1 | 1/2008 | Wiley | |
| 2008/0049639 A1 | 2/2008 | Wiley et al. | |
| 2008/0049640 A1 | 2/2008 | Heinz et al. | |
| 2008/0049927 A1 | 2/2008 | Wiley | |
| 2008/0052387 A1 | 2/2008 | Heinz et al. | |
| 2008/0155537 A1 | 6/2008 | Dinda et al. | |
| 2008/0259794 A1 | 10/2008 | Zou et al. | |
| 2009/0092151 A1 | 4/2009 | Raguet et al. | |
| 2009/0183174 A1* | 7/2009 | Subhraveti | G06F 9/4484 719/313 |
| 2009/0187654 A1 | 7/2009 | Raja et al. | |
| 2009/0204965 A1 | 8/2009 | Tanaka et al. | |
| 2009/0217267 A1 | 8/2009 | Gebhart | |
| 2009/0292858 A1 | 11/2009 | Lambeth et al. | |
| 2010/0023623 A1 | 1/2010 | Saffre et al. | |
| 2010/0027552 A1 | 2/2010 | Hill | |
| 2010/0043068 A1 | 2/2010 | Varadhan et al. | |
| 2010/0100640 A1* | 4/2010 | Nakao | H04N 21/4341 709/246 |
| 2010/0122334 A1 | 5/2010 | Stanzione et al. | |
| 2010/0162238 A1 | 6/2010 | Warfield | |
| 2010/0192152 A1 | 7/2010 | Miyamoto et al. | |
| 2010/0217837 A1 | 8/2010 | Ansari | |
| 2010/0235580 A1 | 9/2010 | Bouvier | |
| 2010/0306763 A1 | 12/2010 | Lambert et al. | |
| 2011/0134930 A1* | 6/2011 | McLaren | H04L 47/34 370/401 |
| 2011/0197280 A1 | 8/2011 | Young et al. | |
| 2011/0209157 A1 | 8/2011 | Sumida et al. | |
| 2011/0222412 A1 | 9/2011 | Kompella | |
| 2011/0231551 A1 | 9/2011 | Hassan et al. | |
| 2011/0252418 A1 | 10/2011 | Havivi et al. | |
| 2011/0276951 A1 | 11/2011 | Jain | |
| 2011/0296234 A1 | 12/2011 | Oshins et al. | |
| 2011/0310899 A1 | 12/2011 | Alkhatib et al. | |
| 2011/0314469 A1 | 12/2011 | Qian et al. | |
| 2012/0042040 A1 | 2/2012 | Bailey et al. | |
| 2012/0072909 A1 | 3/2012 | Malik et al. | |
| 2012/0089845 A1* | 4/2012 | Raleigh | H04L 41/5045 713/176 |
| 2012/0151087 A1 | 6/2012 | Azam | |
| 2012/0151277 A1 | 6/2012 | Yu et al. | |
| 2012/0167083 A1 | 6/2012 | Suit | |
| 2012/0174099 A1 | 7/2012 | Ashok et al. | |
| 2012/0304175 A1 | 11/2012 | Damola et al. | |
| 2012/0307684 A1 | 12/2012 | Biswas et al. | |
| 2012/0331461 A1 | 12/2012 | Fries et al. | |
| 2013/0003538 A1 | 1/2013 | Greenberg et al. | |
| 2013/0031543 A1 | 1/2013 | Angus | |
| 2013/0058215 A1 | 3/2013 | Koponen et al. | |
| 2013/0061297 A1 | 3/2013 | Larsen et al. | |
| 2013/0139165 A1* | 5/2013 | Doukhvalov | G06F 21/567 718/102 |
| 2013/0147906 A1 | 6/2013 | Weiser et al. | |
| 2013/0191850 A1* | 7/2013 | Fischer | G06F 21/606 719/313 |
| 2013/0204971 A1 | 8/2013 | Brandwine et al. | |
| 2013/0212600 A1 | 8/2013 | Harsh et al. | |
| 2013/0227670 A1 | 8/2013 | Ahmad et al. | |
| 2013/0254424 A1 | 9/2013 | Guay et al. | |
| 2013/0262652 A1 | 10/2013 | Vuhk et al. | |
| 2013/0275968 A1 | 10/2013 | Petev et al. | |
| 2013/0332926 A1 | 12/2013 | Jakoljevic et al. | |
| 2014/0012966 A1 | 1/2014 | Baphna | |
| 2014/0016924 A1 | 1/2014 | Gonzalez | |
| 2014/0123140 A1 | 5/2014 | Motoki | |
| 2014/0137109 A1* | 5/2014 | Sharma | H04L 49/356 718/1 |
| 2014/0137188 A1 | 5/2014 | Bartholomay | |
| 2014/0164618 A1 | 6/2014 | Alicherry et al. | |
| 2014/0189050 A1 | 7/2014 | Rijsman et al. | |
| 2014/0201374 A1 | 7/2014 | Ashwood-Smith et al. | |
| 2014/0280499 A1* | 9/2014 | Basavaiah | G06F 9/45558 709/203 |
| 2014/0282528 A1 | 9/2014 | Bugenhagen | |
| 2014/0282529 A1 | 9/2014 | Bugenhagen | |
| 2014/0282944 A1 | 9/2014 | Li | |
| 2014/0307744 A1 | 10/2014 | Dunbar et al. | |
| 2014/0313984 A1 | 10/2014 | Diamond | |
| 2014/0321260 A1 | 10/2014 | Mishra et al. | |
| 2014/0347979 A1 | 11/2014 | Tanaka | |
| 2014/0359556 A1 | 12/2014 | Jujare et al. | |
| 2014/0372788 A1 | 12/2014 | Vavrick et al. | |
| 2015/0049601 A1 | 2/2015 | Bugenhagen | |
| 2015/0074793 A1 | 3/2015 | Dalvi et al. | |
| 2015/0088825 A1 | 3/2015 | Bloom et al. | |
| 2015/0089331 A1 | 3/2015 | Skerry et al. | |
| 2015/0117454 A1 | 4/2015 | Koponen et al. | |
| 2015/0143368 A1 | 5/2015 | Bugenhagen | |
| 2015/0150020 A1 | 5/2015 | Duttagupta et al. | |
| 2015/0207683 A1 | 7/2015 | Adogla | |
| 2015/0207699 A1 | 7/2015 | Fargano et al. | |
| 2015/0244617 A1 | 8/2015 | Nakil et al. | |

(56) References Cited

U.S. PATENT DOCUMENTS

| | | |
|---|---|---|
| 2015/0263946 A1 | 9/2015 | Tubaltsev |
| 2015/0288541 A1 | 10/2015 | Fargano et al. |
| 2015/0288622 A1 | 10/2015 | Fargano et al. |
| 2015/0288767 A1 | 10/2015 | Fargano et al. |
| 2015/0324220 A1 | 11/2015 | Bugenhagen |
| 2015/0339156 A1 | 11/2015 | Vincent et al. |
| 2015/0365281 A1 | 12/2015 | Marino |
| 2016/0006696 A1 | 1/2016 | Donley et al. |
| 2016/0048403 A1 | 2/2016 | Bugenhagen |
| 2016/0050159 A1 | 2/2016 | Cook et al. |
| 2016/0087859 A1 | 3/2016 | Kuan |
| 2016/0197779 A1 | 7/2016 | Soejima |
| 2016/0301668 A1 | 10/2016 | Marquardt et al. |
| 2016/0337206 A1 | 11/2016 | Bugenhagen et al. |
| 2016/0337270 A1 | 11/2016 | Heinonen et al. |
| 2017/0093750 A1 | 3/2017 | McBride et al. |
| 2017/0097834 A1 | 4/2017 | Cropper et al. |
| 2017/0123839 A1 | 5/2017 | Bugenhagen |
| 2017/0177396 A1 | 6/2017 | Palermo |
| 2018/0123974 A1 | 5/2018 | McBride et al. |
| 2018/0150314 A1 | 5/2018 | Bugenhagen |
| 2018/0157515 A1 | 6/2018 | Malloy |
| 2018/0157523 A1 | 6/2018 | Bugenhagen |
| 2018/0159771 A1 | 6/2018 | Malloy |
| 2018/0198669 A1 | 7/2018 | Fargano et al. |
| 2021/0036927 A1* | 2/2021 | Mantri .................... H04L 41/12 |

FOREIGN PATENT DOCUMENTS

| | | |
|---|---|---|
| KR | 10-2012-0060014 | 6/2012 |
| KR | 10-2013-0093717 | 8/2013 |
| KR | 10-1472013 | 12/2014 |
| KR | 10-1475925 | 12/2014 |
| KR | 10-1478307 | 12/2014 |
| KR | 20-140145645 | 12/2014 |
| WO | WO-2014110453 | 7/2014 |
| WO | WO-2014150715 | 9/2014 |
| WO | WO-2015077460 | 5/2015 |
| WO | WO-2015-126430 | 8/2015 |
| WO | WO-2016025497 | 2/2016 |
| WO | WO-2016025501 | 2/2016 |
| WO | WO-2017023396 | 2/2017 |
| WO | WO-2017058350 | 4/2017 |
| WO | WO-2017062344 | 4/2017 |
| WO | WO-2017146768 | 8/2017 |

OTHER PUBLICATIONS

ETSI Group Specification (Oct. 2013), Network Functions Virtualisation (NFV); Use Cases; 50 pages.
Extended European Search Report, dated Mar. 15, 2018, Application No. 15832496.2, filed Aug. 11, 2015; 10 pgs.
Extended European Search Report, dated Nov. 21, 2017, Application No. 14864171.5, filed May 11, 2016; 6 pgs.
Henrik Basilier et al. Ericsson Review. Virtualizing network services—the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.
International Application No. PCT/US2014/024050; International Preliminary Report on Patentability dated Sep. 24, 2015; 6 pages.
International Application No. PCT/US2014/066628; International Preliminary Report on Patentability dated Jun. 2, 2016; 7 pages.
International Application No. PCT/US2015/044682; International Preliminary Report on Patentability dated Mar. 2, 2017; 10 p.
International Application No. PCT/US2015/044682; International Search Report and Written Opinion dated Nov. 16, 2015; 13 pages.
International Application No. PCT/US2015/044690; International Preliminary Report on Patentability dated Feb. 23, 2017; 9 p.
International Application No. PCT/US2015/044690; International Search Report and Written Opinion dated Dec. 4, 2015; 12 pages.
International Application No. PCT/US2016/044882; International Search Report and Written Opinion dated Nov. 7, 2016; 11 pages.
International Preliminary Report on Patentability dated Apr. 10, 2018, Int'l Appl. No. PCT/US16/055293, Int'l Filing Date Oct. 4, 2016; 9 pgs.
International Preliminary Report on Patentability, dated Aug. 28, 2018, Intl Appl. No. PCT/US16/044867, Intl Filing Date Jul. 29, 2016; 10 pgs.
International Search Report and Written Opinion prepared by the Korean Intellectual Property Office as International Searching Authority for PCT Intl Patent App. No. PCT/US2014/024050 dated Jun. 27, 2014; 9 pages.
International Search Report and Written Opinion prepared by the Korean Intellectual Property Office as International Searching Authority for PCT Intl Patent App. No. PCT/US2014/066628 dated Mar. 10, 2015; 10 pages.
International Search Report and Written Opinion prepared by the Korean Intellectual Property Office as International Searching Authority for PCT Intl Patent App. No. PCT/US2016/044867 dated Nov. 23, 2016; 13 pages.
International Search Report and Written Opinion prepared by the Korean Intellectual Property Office as International Searching Authority for PCT Intl Patent App. No. PCT/US2016/055293 dated Jan. 11, 2017; 12 pages.
"Malware Analysis", Wikipedia Retrieved from the Internet: https://en.wikipedia.org/w/index.php?title=Malware_analysis&oldid=595288571 [retrieved Mar. 9, 2018]; Section "What are the Types and Techniques of Malware Analysis" Feb. 13, 2014 , 2 pgs.
"RAD Launches vCPE Platform for Hosting VNFs", *LightReading* (Mar. 17, 2015). Web Site www.lightreading.com/nfv/nfv-elements/rad-launches-vcpe-platform-for-hosting-vnfs. Accessed Sep. 8, 2015 , 1 pg.
Stuart Clayman et al. 'The Dynamic Placement of Virtual Network Functions.' In: 2014 IEEE Network Operations and Management Symposium (NOMS), May 5-9, 2014, pp. 1-9.
Wikipedia (Oct. 2014), "Network Functions Virtualization" http://en.wikipedia.org/wiki/Network_Functions_virtualization; accessed on Oct. 23, 2014; 5 pages.
Batalle, Josep et al., "On the Implementation of NFV over an OpenFlow Infrastructure: Routing Function Virtualization"; Nov. 11, 2013; 3 pages.
Bohoris, Christos , "Network Performance Management Using Mobile Software Agents", *Centre for Communications Systems Research School of Electronics and Physical Sciences; University of Surrey, UK* Jun. 2003 , 188 pgs.
Gowan, Bo , "Ciena unveils a carrier-grade CPE for NFV.", Web Site www.ciena.com/connect/blog/Ciena-unveils-a-carrier-grade-CPE-for-NFV.html. Accessed Sep. 8, 2015 Jun. 22, 2015 , 4 pgs.
Kang, et al., "Optimizing the "One Big Switch" Abstraction in Software-Defined Networks", *ACM, CoNEXT13*; <http://dl.acm.org/citation.cfm?id=2535373&CFIC=968133826&CFTOKEN=57638951> Dec. 2013 , pp. 13-24.
Metzler, Jim et al., "The 2013 Guide to Network Virtualization and SDN"; https://www.avaya.com/en/documents/the_2013_guide_to-network_virtualization_and_sdn.pdf; Dec. 2013; 6 pages.
Slwczak, Piotr , "Configuring Floating IP Addresses for Networking in OpenStack Public and Private Clouds", https://www.mirantis.com/blog/configuring-floating-ip-addresses-networking-openstack-public-private-clouds/ Aug. 10, 2012 , 27 pgs.
Vilalta, et al., "Network Virtualization Controller for Abstraction and Control of Open-Flow-enabled Multi-tenant Multi-technology Transport Networks", *IEEE*; <http://ieeexplore.ieee.org/stamp/stamp.jsp?arnumber=7121738> Jun. 2015 , pp. 103.
Yu, et al., "What SDN will Bring for Transport Networks?", *Open Networking Summit* 2014, <https://www.usenix.org/sites/default/files/ons2014-poster-yu.pdf> Mar. 2014 , pp. 1-2.

* cited by examiner

REMOTING APPLICATION SERVERS

CROSS-REFERENCES TO RELATED APPLICATIONS

This application is a continuation of U.S. application Ser. No. 14/730,695 (the "'695 application), filed Jun. 4, 2015 which claims priority to U.S. Patent Application Ser. No. 62/037,096 (the "'096 application"), filed Aug. 13, 2014 by Charles I. Cook et al., entitled, "Remoting Application Servers." The respective disclosures of these applications are incorporated herein by reference in their entirety for all purposes.

This application may also be related to U.S. patent application Ser. No. 14/678,208 (the "'208 application"), filed on a date on Apr. 3, 2015 by Michael J. Fargano et al., entitled, "Network Functions Virtualization Interconnection Gateway," U.S. patent application Ser. No. 14/678,280 (the "'280 application"), filed on a date on Apr. 3, 2015 herewith by Michael J. Fargano et al., entitled, "Network Functions Virtualization Interconnection Hub," and U.S. patent application Ser. No. 14/678,309 (the "'309 application"), filed on a date on Apr. 3, 2015 by Michael J. Fargano et al., entitled, "Customer Environment Network Functions Virtualization (NFV)." Each of the '208, '280, and '309 applications claims priority to U.S. Patent Application Ser. No. 61/974,927 (the "'927 application"), filed Apr. 3, 2014 by Michael J. Fargano, entitled, "Network Functions Virtualization Interconnection Gateway," U.S. Patent Application Ser. No. 61/974,930 (the "'930 application"), filed Apr. 3, 2014 by Michael J. Fargano, entitled, "Network Functions Virtualization Interconnection Hub," U.S. Patent Application Ser. No. 61/976,896 (the "'896 application"), filed Apr. 8, 2014 by Michael J. Fargano, entitled, "Customer Environment Network Functions Virtualization (NFV)," and to U.S. Patent Application Ser. No. 61/977,820 (the "'820 application"), filed Apr. 10, 2014 by Michael J. Fargano, entitled, "Customer Environment Network Functions Virtualization (NFV)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing application access, and, in particular embodiments, to methods, systems, and computer software for implementing remote access of applications using remoting application servers.

BACKGROUND

In current systems, when a user requests or is the recipient of a requested service or application, the service or application is executed at one or more servers at a central office, at a bank of servers, in a cloud environment, and/or the like that are logically and/or physically (e.g., geographically) distant from the user. In such cases, the interconnections with intermediate servers, nodes, network components, and/or the like might result in reduced or low efficiency network or computing characteristics (including, but not limited to, jitter, delay, bandwidth, and/or the like), which might be susceptible to network bottlenecks that may occur when traversing large networks or portions of networks belonging to (or operated by) different administrative domains.

In alternative systems, the service or application might be downloaded onto local computer systems associated with the user. Such implementations, however, might be susceptible to malicious software or attacks via the downloaded content. In some cases, the downloaded service and/or applications might be hardware and/or resource intensive, which might significantly (and in some cases detrimentally) tax the compute and/or hardware resources that are local to the user's computer systems. In other cases, the services or applications might require certain or particular versions or settings of execution software to optimally execute the applications or services (where such certain or particular versions or settings of execution software might not be installed in the local computer system).

Hence, there is a need for more robust and scalable solutions for implementing application access, by, e.g., implementing remote access of applications using remoting application servers or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
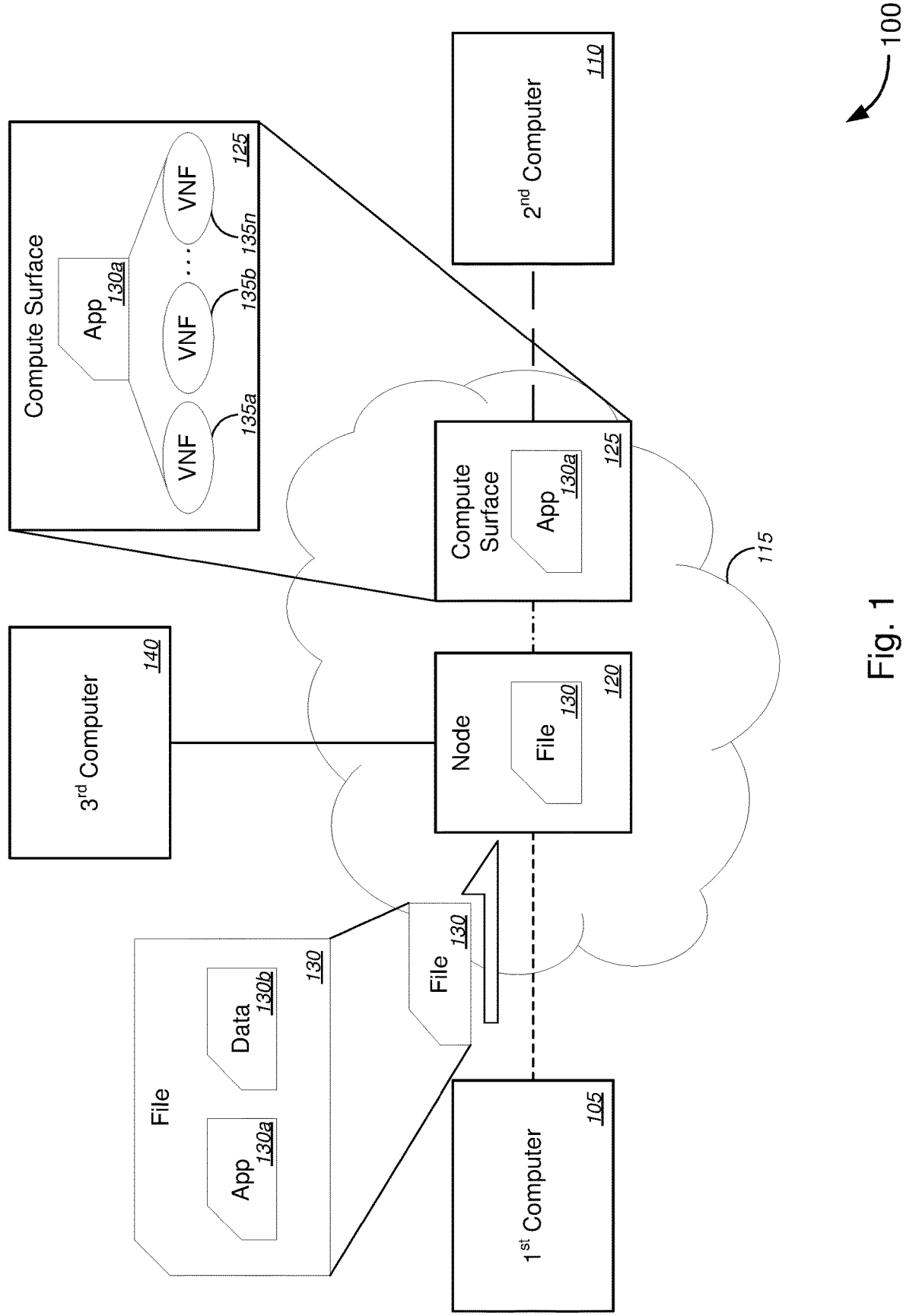
FIG. 1 is a schematic diagram illustrating a system for implementing remote application access, in accordance with various embodiments.

Various embodiments provide techniques for implementing remote application access, and, in some cases, by instantiating an application or service close to the intended recipient or user of the application or service, from a networking perspective.

In some embodiments, a network might provide connectivity between a first computer and a second computer. A file (comprising an application and data) might be transmitted, over the network, from the first computer, either as a single file or as a plurality of packets containing the file. A node in the network, which might be on a path between the first and second computers, might determine that the file contains the application, and, based on such determination, might capture the file (before the second computer can receive it). An instance of the application might be instantiated on a compute surface in the network as a service for the second computer, such that the compute surface can operate on the data with the instance of the application.

In some cases, each of the first and second computer might include without limitation, at least one of a server computer, a cloud computing system or cloud environment, a desktop computer, a laptop computer, a tablet computer, a smart phone, a mobile phone, a personal digital assistant, other suitable user devices, a collection of devices operating as a collective device, and/or the like. In some instances, the first computer might include, without limitation, a server or any device, or the like, that serves as a repository of applications that can be accessed. In some embodiments, the second computer might include, but is not limited to, at least one of a network interface device ("NID"), an optical network terminal ("ONT"), a residential gateway device, a business gateway device, a virtual gateway device, and/or the like In some instances, the application might include a user application to be demonstrated by a user of the first computer for a user of the second computer, where the second computer might lack sufficient resources to execute the application. In some cases, the application might include a computing-based application, which, in some cases, might include an anti-malware application, or the like. According to some embodiments, the data additional to the application might include audio or video content, and the application might include a player for the audio or video content. In some embodiments, the data additional to the application might include, without limitation, one or more of image content, gaming content, messaging content (e.g., e-mail messaging content, video messaging content, voicemail messaging content, text messaging content, and/or the like), data content, application data, execution data, and/or the like.

Merely by way of example, in some aspects, a file can be created with the intent of transporting an application or service to be executed close to the target user/recipient from a networking perspective for optimal performance, which could be achieved from the perspective of an application provider, a content provider, a transport provider, an access provider, a mobile service provider, an end user, or a combination of these entities. Because the application or service is performed in the network at a point that is close to the target user (or end user), from a networking perspective, and/or is performed in a virtual environment, the application can be executed in an optimal manner because delay and jitter (among other characteristics) can be managed to achieve higher performance levels. Further, networking bottlenecks, which may occur when traversing large networks or portions of networks belonging to (or managed by) different administrative domains, can be eliminated.

In some embodiments, it may be advantageous for a transport provider to perform a network function close to the intended target user to distribute that function rather than to centralize the network function. This could be done for security reasons, for example. This could also be done to minimize congestion at certain points in the network. Alternatively, or additionally, this could be done to maintain service level agreements ("SLAs") with customers, and/or to leverage installed/collocated hardware under cloud orchestration control inside a service provider's cloud orchestration system at the end users' locale. According to some embodiments, a content provider might, for performance reasons, want to push content and the application to distribute or execute the content to a location that is closer to its customers, to improve the customers' viewing or listening experience. Other advantages and benefits of such remote application access methods and systems are described in detail below with respect to various non-limiting exemplary embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, network virtualization technology, network configuration technology, application access technology, remote application access technology, and/or the like. In other aspects, certain embodiments, can improve the functioning of a computer or network system itself (e.g., computing devices or systems that form parts of the network, computing devices or systems for performing the functionalities described below, etc.), for example, by enabling implementation of remote application access using remote application servers, by executing the applications in the network at a point close to the target user (from a network perspective) thereby improving network and/or computing system functionalities or improving network and/or computing system efficiencies (including, without limitation, jitter, delay, and/or bandwidth characteristics, or the like), providing isolated, network-based execution of applications (to protect local compute and/or hardware resources of a user's computer system from potentially malicious software or application-based attacks), and/or the like. In particular, to the extent any abstract concepts are present in the various embodiments, those concepts can be implemented as described herein by devices, software, systems, and methods that involve specific novel functionality (e.g., steps or operations), such as implementing remote application access using remote application servers, enabling ITaaS functionality, executing the applications in network at a point close to the target user (from a network perspective), enabling isolated, network-based execution of applications (to protect local compute and/or hardware resources of a user's computer system from potentially malicious software or application-based attacks) and/or the like, to name a few examples, that extend beyond mere conventional computer processing operations. These functionalities can produce tangible results outside of the implementing computer system, including, merely by way of example, ability to execute the applications in network at a point close to the target user (from a network perspective) thereby achieving improved network and/or computing system operations or improved network and/or computing system operation efficiencies (including, without limitation, jitter, delay, and/or bandwidth characteristics, or the like), ability to remotely access applications, ability to provide isolated, network-based execution of applications (to protect local compute and/or hardware resources of a user's computer system from potentially malicious software or application-based attacks), and/or the like, any of which may be observed or measured by customers and/or service providers.

In an aspect, a method might comprise providing, with a network, connectivity between a first computer and a second computer, and transmitting, over the network, a file from the first computer toward a second computer, the file comprising an application and data additional to the application. The method might also comprise determining, with a node in the network on a path between the first computer and the second computer, that the file contains the application, and capturing, with the node in the network, the file containing the application and the data, before the second computer can receive the file. The method might further comprise instantiating an instance of the application on a compute surface in the network as a service for the second computer, and operating on the data with the instance of the application.

In some embodiments, the network might be a software defined network ("SDN"). In some cases, the compute surface might comprise one or more virtualized network functions ("VNFs"), and the application might be mapped to the one or more VNFs. According to some embodiments, the compute surface might be hosted on a virtual machine. In some instances, the virtual machine might be hosted in a cloud environment. Alternatively, the virtual machine might be hosted on the second computer.

According to some embodiments, the first computer might comprise at least one of a server computer, a cloud computing system or cloud environment, a desktop computer, a laptop computer, a tablet computer, a smart phone, a mobile phone, a personal digital assistant, a repository of applications, or a collection of devices operating as a collective device, and/or the like. The first computer might, in some cases, include, without limitation, a server or any device, or the like, that serves as a repository of applications that can be accessed. In some instances, the second computer might comprise at least one of a server computer, a cloud computing system or cloud environment, a desktop computer, a laptop computer, a tablet computer, a smart phone, a mobile phone, a personal digital assistant, or a collection of devices operating as a collective device. In some cases, the second computer might be a customer premises gateway that serves as a demarcation between a provider portion of the network and a customer portion of the network, and the compute surface might be located in the customer portion of the network. In some embodiments, the data additional to the application might be audio or video content, and the application might be a player for the audio or video content.

Merely by way of example, in some embodiments, the method might further comprise selecting one or more compute surface locations in the network to instantiate the instance of the application. The method might also comprise receiving user input, and selecting a location in the network might comprise selecting a location based at least in part on the user input. The user input, in some instances, might be received from a sender or recipient of the file. In some cases, the user input might specify requirements for selecting a location in the network to instantiate the instance of the application. The requirements might be specified in a field of a specified format (including, but not limited to, TOSCA, CSAR, and/or the like). According to some embodiments, selecting a location might comprise selecting a location in logical proximity to the second computer.

According to some embodiments, the method might further comprise receiving, with the node in the network, second data from at least one of the user, the first computer, or a separate third computer, the second data being different from the data contained in the file. The method might also comprise operating on the second data with the instance of the application.

In some instances, the second computer might comprise a programmable hardware device, and wherein the application is a management application for the programmable hardware device. The programmable hardware, in some cases, might comprise a software defined radio ("SDR") in the network and the application might be a radio management application for managing the SDR. In some embodiments, the radio management application might operate the SDR as one or more of an unlicensed spectrum access point on a subscriber network or a licensed spectrum access point on a provider network. In alternative cases, the programmable hardware might be capable of machine-to-machine communication, and the application might program the programmable hardware to perform machine-to-machine communication.

According to some embodiments, the application might be a user application to be demonstrated by a user of the first computer for a user of the second computer, and the second computer might lack sufficient resources to execute the application. In some instances, the application might be a computing-based application. In some cases, the computing-based application might be an anti-malware application.

In some instances, transmitting the file might comprise transmitting, over the network, a file from the first computer toward a second computer in response to an external event trigger (e.g., performance issues, emergency events, market activities, sensor triggers, and/or the like). In some embodiments, determining that the file contains the application might comprise detecting an identifier associated with the file. In some cases, the file might be transmitted in one or more packets over the network, and the identifier might comprise a tag applied to at least one of the one or more packets. In some instances, the file might be transmitted in one or more packets over the network, and the identifier might comprise a wrapper around at least some of the one or more packets. The wrapper, according to some embodiments, might include instructions for executing the application. In some embodiments, the identifier might be a signature applied to the file or to one or more packets by which the file is transmitted over the network.

Merely by way of example, in some instances, the method might further comprise receiving, at the node in the network, instantiation instructions from a third computer, and instantiating an instance of the application might comprise instantiating an instance in accordance with the instantiation instructions.

In another aspect, an apparatus might be provided at a node in a network that provides connectivity between a first computer and a second computer. The apparatus might comprise a non-transitory computer readable medium having encoded thereon a set of instructions executable by one or more computers to cause the apparatus to perform one or more operations. The set of instructions might comprise instructions for receiving a file in transit from the first computer toward the second computer, the file comprising an application and data additional to the application. The set of instructions might further comprise instructions for determining that the file contains the application, instructions for capturing the file containing the application and the data, before the second computer can receive the file, and instructions for instantiating an instance of the application on a compute surface in the network as a service for the second computer, such that the compute surface can operate on the data with the instance of the application.

In yet another aspect, a computer system might be provided. The computer system might comprise a network that provides connectivity between a first computer and a second computer, and a node in the network, on a path between the first computer and the second computer. The node might comprise one or more processors and a computer readable medium in communication with the one or more processors. The computer readable medium might have encoded thereon a set of instructions executable by the one or more processors to cause the node to perform one or more operations. The set of instructions might comprise instructions for receiving a file in transit from the first computer toward the second computer, the file comprising an application and data additional to the application. The set of instructions might further comprise instructions for determining that the file contains the application, instructions for capturing the file containing the application and the data, before the second computer can receive the file, and instructions for instantiating an instance of the application on a compute surface in the network as a service for the second computer, such that the compute surface can operate on the data with the instance of the application.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

Figure 5:
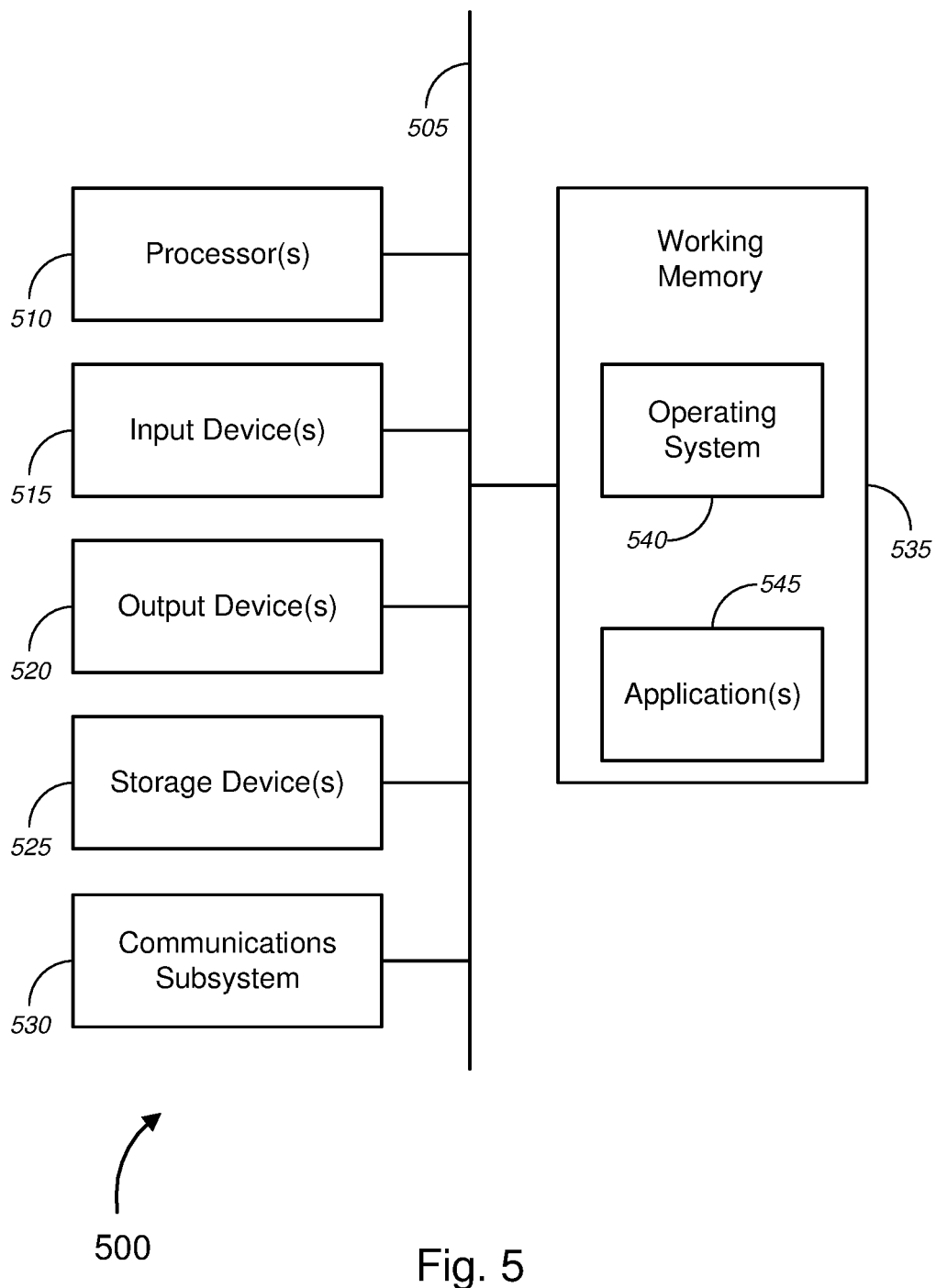
FIG. 5 is a block diagram illustrating an exemplary computer or system hardware architecture, in accordance with various embodiments.
Figure 6:
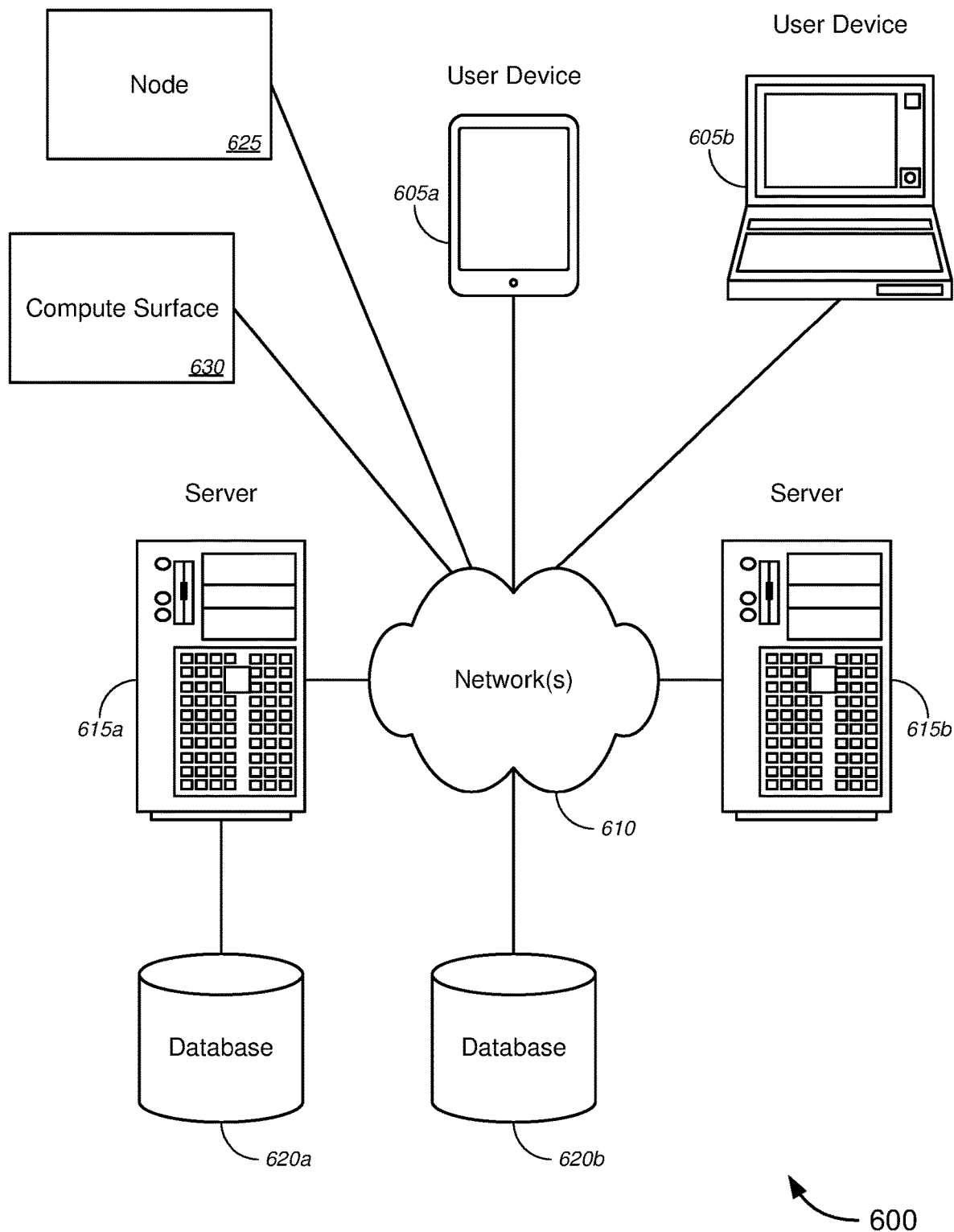
FIG. 6 is a block diagram illustrating a networked system of computers, computing systems, or system hardware architecture, which can be used in accordance with various embodiments.

We now turn to the embodiments as illustrated by the drawings. FIGS. 1-6 illustrate some of the features of the method, system, and apparatus for implementing remote application access, as referred to above. FIGS. 1-4 illustrate some of the specific (although non-limiting) exemplary features of the method, system, and apparatus for implementing remote application access, while FIGS. 5 and 6 illustrate exemplary system and hardware implementation. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing remote application access, in accordance with various embodiments. In the embodiment of FIG. 1, system 100 might comprise a first computer 105, a second computer 110, and a network 115 that provides connectivity between the first computer 105 and the second computer 110. In some embodiments, each of the first computer 105 and the second computer 110 might include, without limitation, at least one of a server computer, a cloud computing system or cloud environment, a desktop computer, a laptop computer, a tablet computer, a smart phone, a mobile phone, a personal digital assistant, other suitable user devices, and/or the like. In some instances, the first computer might include, without limitation, a server or any device, or the like, that serves as a repository of applications that can be accessed. According to some embodiments, at least one of the first computer 105 and/or the second computer 110 might each include, without limitation, a collection of devices operating as a collective device, as in an Internet of Things ("IoT") arrangement, configuration, or system, and/or the like. For example, such a collection of devices might include devices in a Smart Home or Smart Building that provide one or more of automation, energy management, security functions, and/or the like. In some embodiments, the second computer 110 might include, but is not limited to, at least one of a network interface device ("NID"), an optical network terminal ("ONT"), a residential gateway device, a business gateway device, a virtual gateway device, and/or the like.

In some instances, network 115 can include, but is not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network 115 might include an access network of the service provider (e.g., an Internet service provider ("ISP")). In another embodiment, the network 115 might include a core network of the service provider, and/or the Internet. According to some embodiments, the network 115 might include a software defined network ("SDN"), or the like.

The system 100 might further comprise at least one node 120 (in some cases, a plurality of nodes 120) and at least one compute surface 125 (in some cases, a plurality of compute surfaces 125). In various embodiments, the at least one node 120 might include, without limitation, an apparatus, a server, a router, or other suitable computing device, and/or the like, that is located in the network, along a path between the first computer and the second computer. A plurality of nodes 120 may be distributed through the network 115, and data traffic may be transmitted via at least one such node 120 for any data transfer between any two computers connected via the network 115 (e.g., first computer 105 and second computer 110, but not limited to these two computers).

According to various embodiments, "compute surface" (as used herein) might refer to any suitable hardware-based or virtual compute resource that may be located or hosted at the node, located in the network, located in a cloud computing environment, located at a customer premises gateway device, located in the second computer, and/or the like, and in some cases located at a virtual machine, which might be located or hosted at one or more of these locations in the network. In some instances, the customer premises gateway might serve as a demarcation between a provider portion of the network and a customer portion of the network, and the compute surface might be located or hosted in the customer portion of the network.

In operation, a first computer might send a file 130—which might include, but is not limited to, an application (or "app") 130a and data additional to the app (or simply "data") 130b. The file 130 might be intended to be sent to the second computer 110, and/or the second computer 110 might have requested the file 130 (or at least one of the app 130a and/or the data 130b). At least one node 120 that is in the path, in network 115, between the first computer 105 and the second computer 110 might intercept the file 130 while it is in transit (i.e., before the file 130 is received by the second computer 110) (as shown via the dash lines between the first computer 105 and the node 120 in FIG. 1). In some instances, the at least one node 120 might intercept the file 130 in a manner that prevents the second computer 110 from receiving the file 130.

In some cases, the node 120 might determine that the file 130 contains the application 130a, and might capture the file 130a (containing the application 130a) before the second computer 110 can receive the file 130. The node 120 might instantiate an instance of the application 130a on a compute surface 125 in the network 115 as a service for the second computer 110 (as shown via the dot-dash lines between the node 120 and the compute surface 125 in FIG. 1). In some cases, the compute surface 125 might operate on the data 130b with the instance of the application 130a. According to some embodiments, the compute surface 125 might include, without limitation, one or more virtualized network functions ("VNFs") 135a-135n (collectively, "VNFs 135"), and the application 130a might be mapped to the one or more VNFs 135. Once instantiated on the compute surface, which might be located at a network location that is in logical or physical proximity to the second computer 110, the service associated with the application 130a may be accessed by the second computer via web portals, via application programming interfaces ("APIs"), via virtual machine ("VM") tunnels, and/or the like (as shown via the long dash lines between the compute surface 125 and the second computer 110 in FIG. 1).

According to some embodiments, the file 130 may be intercepted. The file 130 may be addressed to a specific compute surface, as determined by the first computer 105, as determined by some other orchestrating function in the network 115, or as managed by a third party (e.g., a content provider, a service provider associated with the network 115, a service provider that is separate from the network service provider, and/or the like), and/or the like. In some cases, the user associated with the second computer 110 may possibly direct where the application is run (either directly by expressly specifying such location or indirectly by simply requesting for particular devices or classes of devices, with the node or other computing system determining the compute surface to best execute the application contained in the file (as described herein)).

In some embodiments, system 100 might further comprise a third computer 140, which might send instantiation instructions to the node 120, in which case the node 120 might instantiate the instance of the application 130a in accordance with the instantiation instructions. In alternative embodiments, data 130b might include instantiation instructions, upon which the node 120 might base its process of instantiating the instance of the application 130a.

Because the application 130a is performed in the network 115 at a point that is close to the target user (i.e., user associated with the second computer 110), from a networking perspective, and/or is performed in a virtual environment, the application 130a can be executed in an optimal manner because delay and jitter (among other characteristics) can be managed to achieve higher performance levels. Further, networking bottlenecks, which may occur when traversing large networks or portions of networks belonging to (or managed by) different administrative domains, can be eliminated.

In other words, a file can be created with the intent of transporting an application or service to be executed close to the target user/recipient from a networking perspective for optimal performance, which could be achieved from the perspective of an application provider, a content provider, a transport provider, an access provider, a mobile service provider, an end user, or a combination of these entities.

For example, it may be advantageous for a transport provider to perform a network function close to the intended target user to distribute that function rather than to centralize the network function. This could be done for security reasons, for example. This could also be done to minimize congestion at certain points in the network. Alternatively, or additionally, this could be done to maintain service level agreements ("SLAs") with customers, and/or to leverage installed/collocated hardware under cloud orchestration control inside a service provider's cloud orchestration system at the end users' locale.

In another example, a content provider might, for performance reasons, want to push content and the application to distribute or execute the content to a location that is closer to its customers, to improve the customers' viewing or listening experience.

In yet another example, an information technology as a service ("ITaaS") provider might offer special Wi-Fi access point software that allows placement of WLAN management on compute environments (e.g., x86 compute environments, or the like) and associated storage systems needed for WLAN management and control or programming of field programmable gate arrays ("FPGAs") or the like on software defined radios ("SDRs") for placement of the access point element, and leveraging antennas attached to the cloud controlled/orchestrated hardware to deliver the service offering.

In still another example, a mobile network operator might offer to subscribers the ability to consume virtual hardware from their fixed-line provider to instantiate small cells, microcells, picocells, femtocells, office/campus eNodeB or home eNodeB ("HeNB"), and/or the like, at subscribers' current locations to enable drain across fixed-line providers' network back toward the mobile network operator's network over higher performance transport.

In another example, a person might have a particular application that he or she would like to show a target user. It may be unknown whether the target user's computer has the capabilities to run the application (or perhaps has a version that would likely not allow all of the features of the application to be fully utilized). Rather than running the application on the target user's computer, the application may be run on a virtual machine that is in close proximity (network-wise) to the target user's computer.

In yet another example, a service might be provided that isolates or protects an end user from malicious attacks that may result from downloading or executing code on a local computing resource. This can be done by running the application on network computer and storage resources, and providing a viewing window for the end user to see the results (and/or interact with application). Consequently, the application is run without putting the end user's compute and storage resources at risk. Of course, this assumes that the network adequately protects itself from such malicious attacks.

In some embodiments, a file may be marked or tagged in such a way that signals the network (or the node in the network) that there is an application that is to be run by compute resources on the network. This may be accomplished by tagging packets in a similar manner as VLAN tagging. Another method might be to create a wrapper around the packets transporting the application, with the wrapper containing information and/or instructions for network execution of the application. The network might remove the wrapper and might perform the requested functions, based at least in part on the information and/or instructions. Yet another way might be to include signatures in the file or packets transporting the application, with the signatures signaling the network that compute resources are needed and identifying what to execute.

The network 115 may be one that is capable of supporting SDN, network functions virtualization ("NFV"), and/or the creation of virtual machines ("VMs"). When the network (or a node 120) detects that a function (or service) is being requested, it might read the request, might create a VM, and might run the application. If the network has a set of virtualized functions (e.g., VNFs), the application might be mapped to those virtualized functions (e.g., VNFs) and executed accordingly. One or more basic functions or applications can be tied together to form a more complex application or service, in a process referred to as "service chaining."

Generally, the application might be run in the network 115 using network compute and storage resources. If the application is addressed to be delivered to a target user, it could be run on the target user's own computing resources local to the user, or within private/virtual-private hosting facilities leveraging the service provider's orchestration systems that control compute, storage, and network resources. While this has been done with network-based installers in the past, this has created security issues. To address the security issues, the user could utilize a browser with a plug-in or some other interface to add functionality to the browser that results in the creation of a VM in which the application can be run without compromising the target user's computing resources (other than to put additional load on the user's local computing resources).

Figure 2:
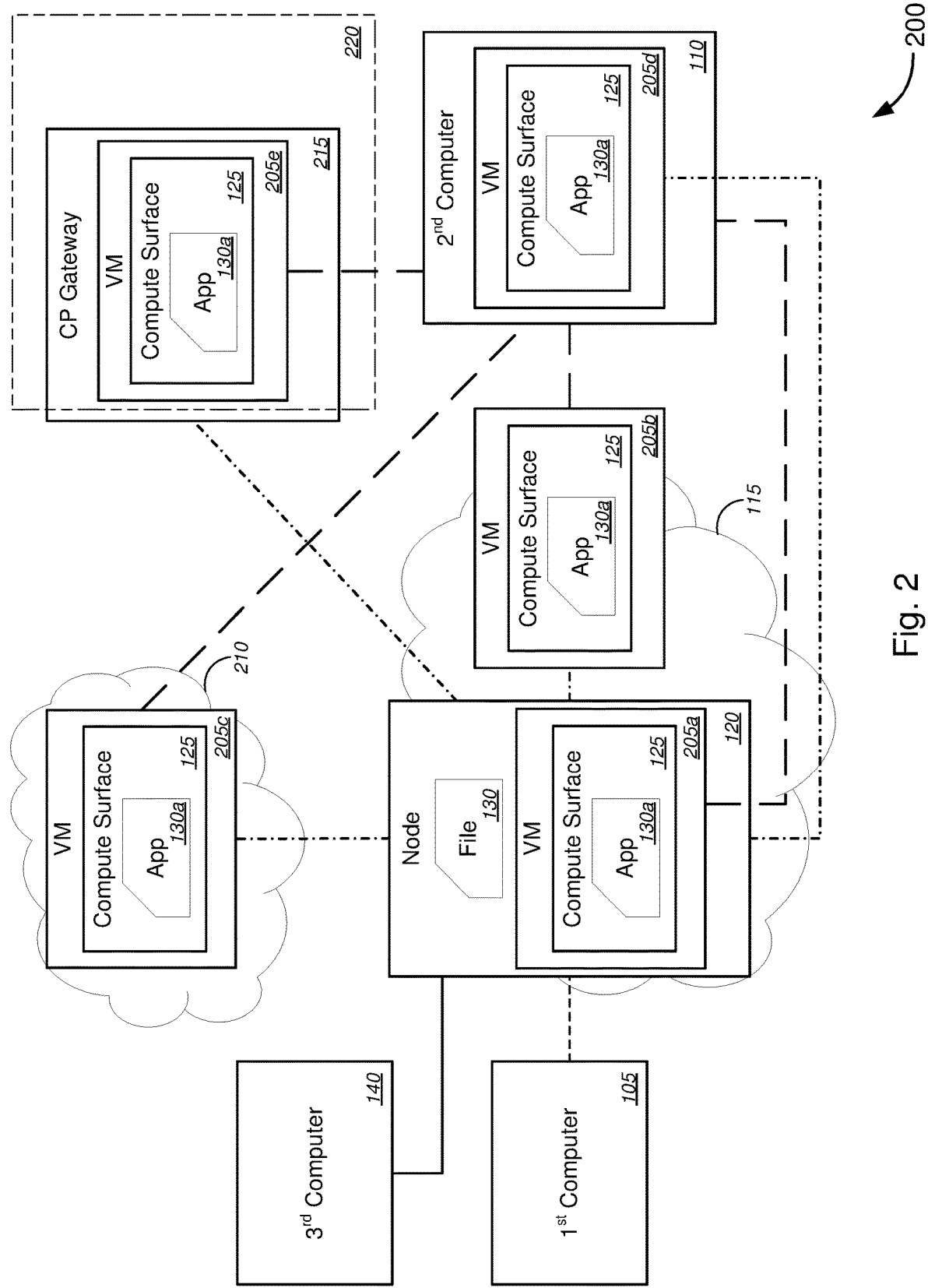
FIG. 2 is a schematic diagram illustrating another system for implementing remote application access, in accordance with various embodiments.

FIG. 2 is a schematic diagram illustrating another system 200 for implementing remote application access, in accordance with various embodiments. The embodiments of FIG. 2 are similar, if not identical, to the embodiments of FIG. 1, except that FIG. 2 shows various embodiments of compute surfaces 125 being located or hosted on VMs 205 in various locations in the network 115 (or outside the network 115). For example, VM 205a (hosting a compute surface 125) might itself be hosted in node 120, while VM 205b (hosting a compute surface 125) might be located in another (separate) location in network 115. In some embodiments, VM 205c (hosting a compute surface 125) might be located in a cloud computing environment 210 or other network 210. In some instances, the VM 205d (hosting a compute surface 125) might be located or hosted in the second computer 110. According to some embodiments, VM 205e (hosting a compute surface 125) might be located or hosted within a customer premises ("CP") gateway device 215 (e.g., a business gateway ("BG") device, a residential gateway ("RG") device, a virtual gateway ("vG") device, and/or the like), which might be located at a customer premises 220 or a customer network 220. In some cases, the customer premises gateway device 215 might serve as a demarcation between a provider portion of the network and a customer portion of the network, and the VM 205e and/or the compute surface hosted thereon might be located in the customer portion of the network (i.e., in the customer premises 220 or in the customer network 220).

According to various embodiments, two or more of the VMs 205a-205e (with their respective compute surfaces 125) might operate to instantiate instances of the application 130a or portion of the application 130a, and any portions of the applications 130a may be service chained together to provide the service offered by a single, complete application 130a, in a manner similar to service chaining as described in detail in any of the '208, '280, and '309 applications (which are already incorporated herein by reference in their entirety). In other embodiments, the compute surface 125 may logically be distributed across multiple locations. In some cases, portions of the compute surface 125 may be in both the customer network and the service provider network, and possibly also in a third party network that could be a content provider network, a service provider network, a cloud computing network, or another customer network, and/or the like. In some embodiments, the location of the instantiated instance of the application 130a may be distributed over multiple compute surface locations. In some instances, the compute surface(s), on which the instance of the application is instantiated, might correspond to the selected one or more compute surface locations.

The embodiments of FIG. 2 are otherwise similar, or identical, to the embodiments of FIG. 1, and the description of the various components of system 100 are similarly applicable to the corresponding components of system 200.

Figure 3:
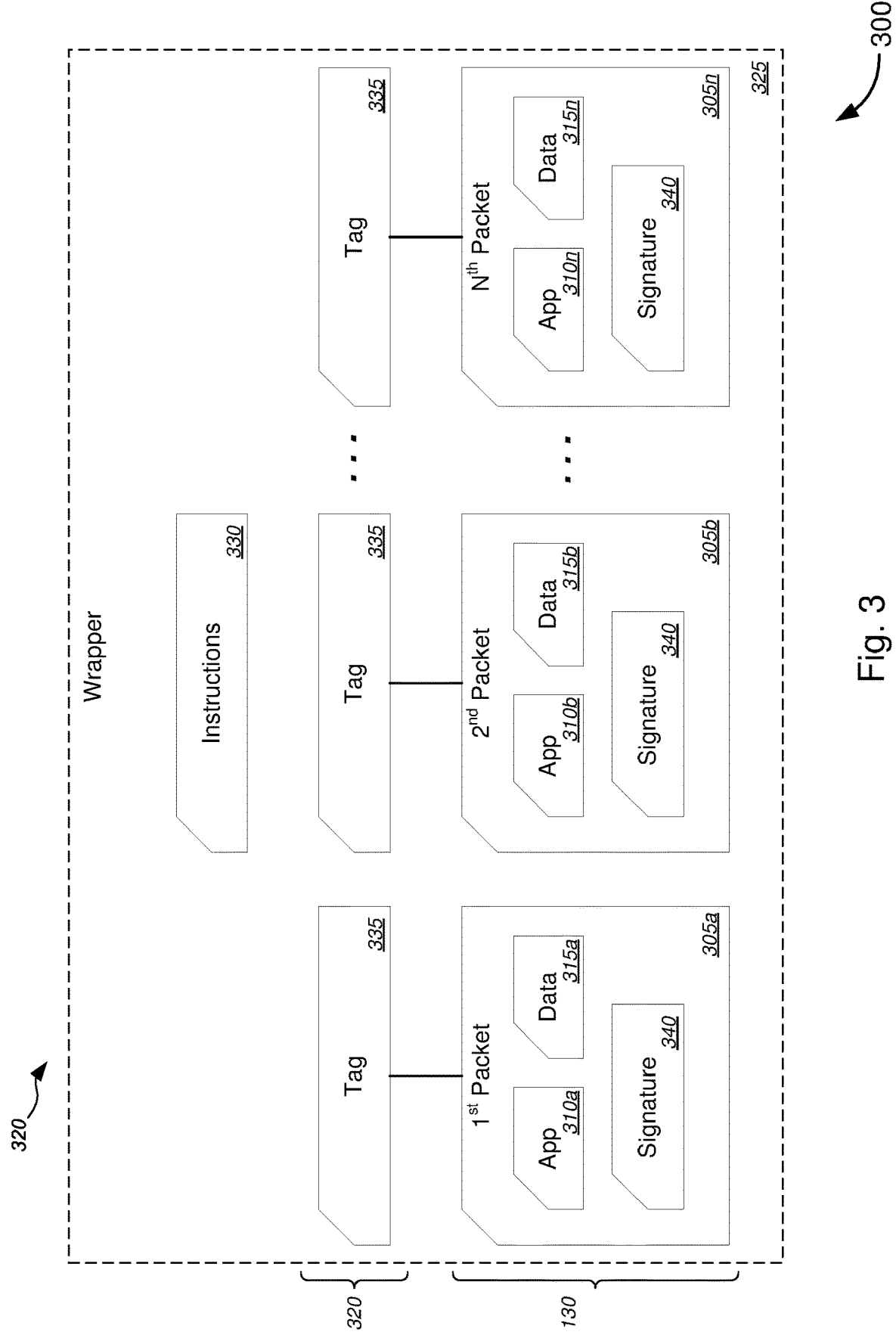
FIG. 3 is a schematic diagram illustrating various embodiments of a file that is transmitted between computing systems for implementing remote application access.

FIG. 3 is a schematic diagram illustrating various embodiments 300 of a file 130 that is transmitted between computing systems for implementing remote application access. In various embodiments of FIG. 3, file 130 might be transmitted as a plurality of packets 305, including a first packet 305a, a second packet 305b, through an $N^{th}$ packet 305n. In some embodiments, file 130 comprises application 310 and data 315 (which might respectively correspond to application 130a and data 130b of FIGS. 1 and 2), and each of application 310 and data 315 might be (divided and) distributed amongst the first through $N^{th}$ packets 305a-305n. For example, application (or application portion) 310a and data (or data portion) 315a might be transmitted in the first packet 305a, while application (or application portion) 310b and data (or data portion) 315b might be transmitted in the second packet 305b, and so on, with application (or application portion) 310n and data (or data portion) 315n being transmitted in the $N^{th}$ packet 305n.

According to some embodiments, file 130 might comprise an identifier 320 associated with the file, and the identifier 320 might identify at least one of the application (or application portions) 310 contained in the file 130, information regarding the application 310 (e.g., whether sent as a packet, how many packets are being sent, how to combine the packets to obtain the complete application, etc.), information regarding the data (or data portions) 315 (e.g., whether sent as a packet, how many packets are being sent, how to combine the data to recover all data that is sent, etc.), sender information, recipient information, execution instructions for the application 310, information regarding how data contained in data 315 may be used with the application 310, information regarding compute surface locations where the application can be executed, and/or the like.

In some cases, the identifier 320 might be embedded in one or more data portions 315a-315n (not shown). In alternative cases, identifier 320 might include a wrapper 325 around at least some of the one or more packets 305a-305n. In the example shown in FIG. 3, identifier 320 includes wrapper 325 around all of the packets 305a-305n; although the various embodiments are not so limited, and wrapper 325 may encompass any one or more of packets 305, but not all of the packets 305. In some embodiments, wrapper 325 might include, without limitation, instructions 330 for executing the application. Once received by the node in the network, the node might determine that the wrapper contains a file, which contains the application, and might capture the file in the wrapper. Prior to instantiating an instance of the application on a compute surface, the node might remove the wrapper, and might combine the application portions 310a-310n (if transmitted in packets 305), all based at least in part on information in the identifier 320 and/or based at least in part on information in the instructions 330.

In some instances, identifier 320 might include a tag 335 applied to at least one packet 305 of the one or more packets 305a-305n. In the example shown in FIG. 3, tag 335 is shown applied to each of the packets 305a-305n; although the various embodiments are not so limited, and tag 335 may be applied to any one or more of packets 305, but not all of the packets. According to some embodiments, identifier 320 might include signature 340, which might be applied to the file 130 and/or to one or more packets 305 by which the file 130 is transmitted over the network.

The various embodiments of the file 130 in FIG. 3 may be transmitted over the network 115 of FIGS. 1 and 2, rather than the single file 130 of FIGS. 1 and 2. The embodiments of FIGS. 1 and 2, using the packetized file 130, would otherwise be similar, if not identical, to those as described above with respect to the single file 130 embodiments of single file 130 of FIGS. 1 and 2.

Figure 4A:
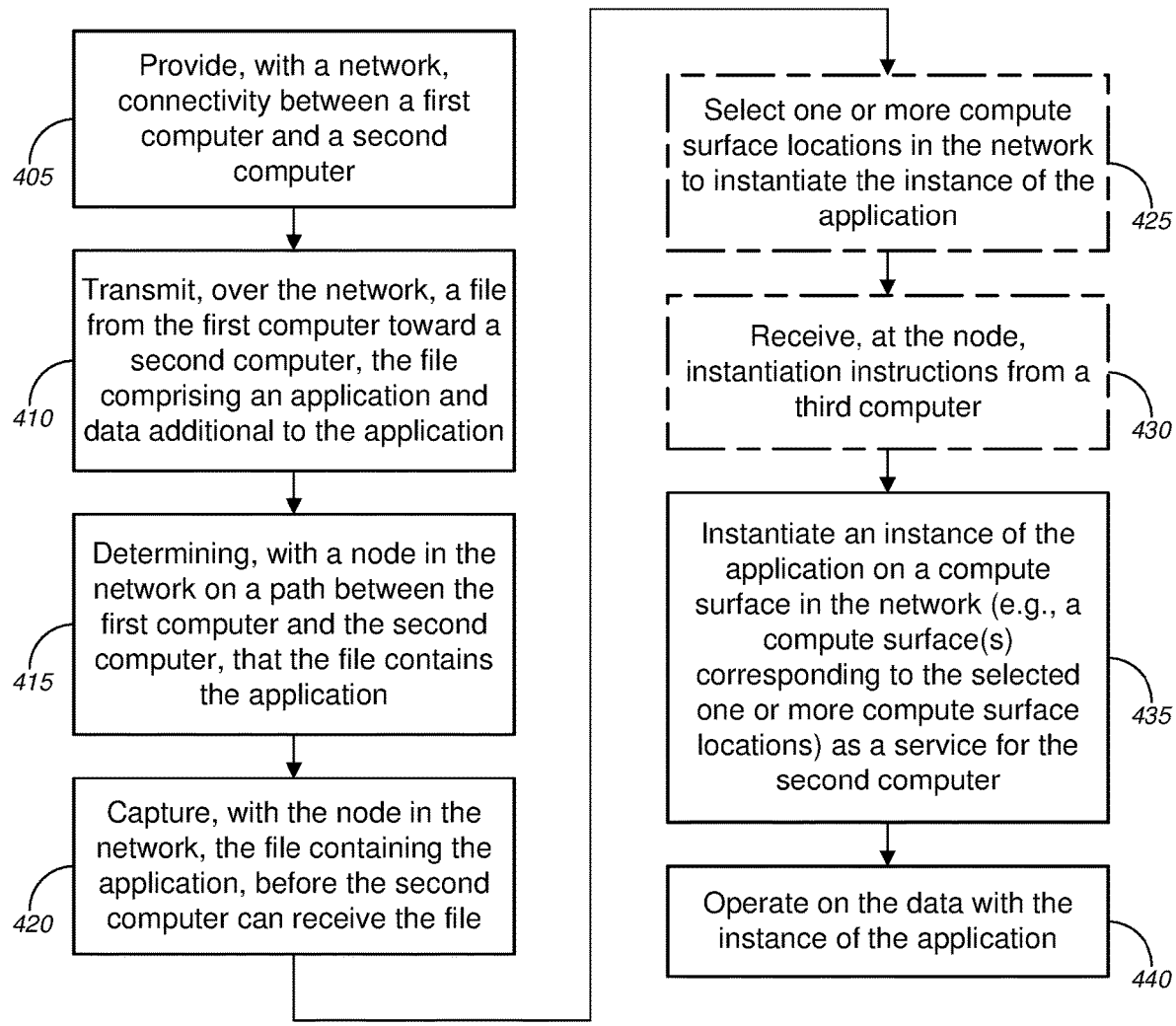
FIGS. 4A and 4B represent a system flow diagram illustrating a method for implementing remote application access, in accordance with various embodiments.
Figure 4B:
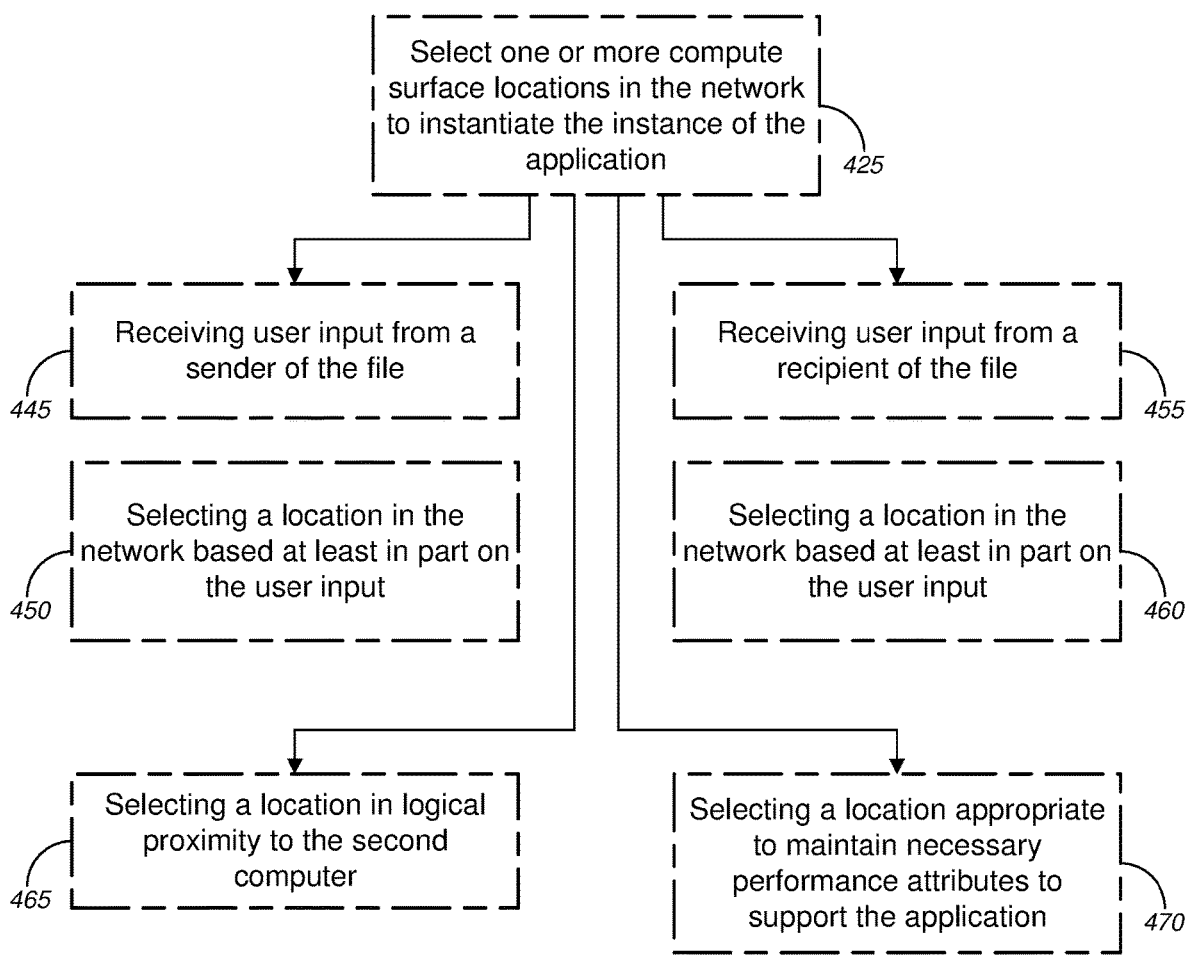

FIGS. 4A and 4B (collectively, "FIG. 4") represent a system flow diagram illustrating a method 400 for implementing remote application access, in accordance with various embodiments. The embodiments as represented in FIG. 4 are merely illustrative and are not intended to limit the scope of the various embodiments. With reference to FIG. 4, method 400 in FIG. 4B illustrates alternative embodiments for selecting one or more compute surface locations in the network to instantiate the instance of the application in optional block 425 of FIG. 4A.

While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by or with (and, in some cases, are described below with respect to) the systems 100 and 200 of FIGS. 1 and 2, respectively (or components thereof), in some cases using (for example, but not limited to) the embodiment 300 of a file comprising an application and data additional to the application of FIG. 3, such methods may also be implemented using any suitable hardware implementation and using other embodiments of a file (e.g., embodiments of a single file, etc.). Similarly, while each of the systems 100 and 200 of FIGS. 1 and 2, respectively (or components thereof), using (for example, but not limited to) the embodiment 300 of a file comprising an application and data additional to the application of FIG. 3 (or other embodiments of a file, such as embodiments of a single file), can operate according to the method illustrated by FIG. 4 (e.g., by executing instructions embodied on a computer readable medium), the systems 100 and 200, using (for example, but not limited to) the embodiment 300 of a file comprising an application and data additional to the application of FIG. 3 (or other embodiments of a file, such as embodiments of a single file), can each also operate according to other modes of operation and/or perform other suitable procedures.

In the embodiment of FIG. 4, method 400, at block 405, might comprise providing, with a network, connectivity between a first computer and a second computer. In some embodiments, the network can include, but is not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet. According to some embodiments, the network might include a software defined network ("SDN"), or the like.

In some cases, each of the first and second computer might include without limitation, at least one of a server computer, a cloud computing system or cloud environment, a desktop computer, a laptop computer, a tablet computer, a smart phone, a mobile phone, a personal digital assistant, other suitable user devices, and/or the like. In some embodiments, the second computer might include, but is not limited to, at least one of a network interface device ("NID"), an optical network terminal ("ONT"), a residential gateway device, a business gateway device, a virtual gateway device, and/or the like. In some instances, the first computer might include, without limitation, a server or any device, or the like, that serves as a repository of applications that can be accessed. According to some embodiments, at least one of the first computer and/or the second computer might each include, without limitation, a collection of devices operating as a collective device, as in an Internet of Things ("IoT") arrangement, configuration, or system, and/or the like. For example, such a collection of devices might include devices in a Smart Home or Smart Building that provide one or more of automation, energy management, security functions, and/or the like.

At block 410, method 400 might comprise transmitting, over the network, a file from the first computer toward a second computer. In some embodiments, transmitting the file from the first computer toward the second computer might comprise transmitting the file from the first computer with the intent to send the file to the second computer. In some cases, transmitting the file from the first computer toward the second computer might comprise transmitting the file from the first computer with the intent to not be received by the second computer, but rather to intercept the file along the path (prior to the file reaching the second computer; in some cases, to allow the application in the file to be executed in the network in a manner isolated from (while protecting) the compute and hardware resources on the second computer). In some instances, transmitting the file from the first computer toward the second computer might comprise transmitting the file from the first computer with the intent to send the file to a VM being hosted on the second computer (the VM being isolated from (while protecting) the compute and hardware resources on the second computer). According to some embodiments, transmitting the file from the first computer might be performed in response to (or based at least in part on) a request for the file, the application, and/or the service from the second computer (or from a user associated with the second computer). The file may be transmitted as a single file or as a plurality of packets, as described in detail above with respect to FIGS. 1-3. According to some embodiments, transmitting the file might comprise transmitting, over the network, a file from the first computer toward a second computer in response to an external event trigger—including, without limitation, performance issues, emergency events, market activities, sensor triggers, and/or the like. In some cases, the sending of the file may be triggered by such external events or external triggers on behalf of the user associated with the second computer or a set of users/customers associated with a class of second computers (e.g., for purposes of automation or the like).

The file, in some embodiments, might comprise an application and data additional to the application. In some embodiments, the application might enable a service to be accessed or utilized by a user (i.e., a recipient) associated with the second computer. In some instances, the second computer might include a programmable hardware device, and the application might be a management application for the programmable hardware device. In some cases, the programmable hardware might include a software defined radio ("SDR") in the network, and the application might include a radio management application for managing the SDR. The radio management application, in some instances, might operate the SDR as one or more of an unlicensed spectrum access point on a subscriber network or a licensed spectrum access point on a provider network. In some alternative cases, the programmable hardware might be capable of machine-to-machine communication, and the application might program the programmable hardware to perform machine-to-machine communication. According to some embodiments, the programmable hardware device might include an external device with a microprocessor, memory, storage, and interfaces. The programmable hardware device, in some cases, might include one of a USB plug-in device, a device with an Ethernet port(s) that may be plugged into a residential gateway/business gateway LAN port(s), a device that may be plugged in-line between the network and the customer premises equipment ("CPE"). In some embodiments, the network might be configured to cascade, ring, mesh, or otherwise connect the programmable devices in various topologies to perform their function(s). Alternatively, the programmable devices may be internal or integrated with other devices in the network.

In some instances, the application might include a user application to be demonstrated by a user of the first computer for a user of the second computer, where the second computer might lack sufficient resources to execute the application. In some cases, the application might include a computing-based application, which, in some cases, might include an anti-malware application, or the like. According to some embodiments, the data additional to the application might include audio or video content, and the application might include a player for the audio or video content. In some embodiments, the data additional to the application might include, without limitation, one or more of image content, gaming content, messaging content (e.g., e-mail messaging content, video messaging content, voicemail messaging content, text messaging content, and/or the like), data content, application data, execution data, and/or the like.

Method 400 might further comprise determining, with a node in the network on a path between the first computer and the second computer, that the file contains the application (block 415). In some embodiments, the node might include, without limitation, an apparatus, a server, a router, or other suitable computing device, and/or the like, that is located in the network, along a path between the first computer and the second computer. A plurality of nodes may be distributed through a network, and data traffic may be transmitted via at least one such node for any data transfer between any two computers connected via the network. According to some embodiments, determining that the file contains the application might comprise detecting an identifier associated with the file. In some cases, the file might be transmitted in one or more packets over the network, and the identifier might include a tag applied to at least one of the one or more packets. In some instances, the file might be transmitted in one or more packets over the network, and the identifier might include a wrapper around at least some of the one or more packets. The wrapper might, in some cases, include instructions for executing the application. In some embodiments, the identifier might include a signature applied to the file or to one or more packets by which the file is transmitted over the network.

Method 400, at block 420, might comprise capturing, with the node in the network, the file containing the application and the data, before the second computer can receive the file. At optional block 425, method 400 might comprise selecting one or more compute surface locations in the network to instantiate the instance of the application. In some embodiments, method 400, at optional block 430, might comprise receiving, at the node in the network, instantiation instructions from a third computer. In alternative embodiments, the instantiation instructions might be included in the data additional to the application.

At block 435, method 400 might comprise instantiating an instance of the application on a compute surface in the network as a service for the second computer. Method 400 might comprise operating on the data with the instance of the application (block 440). In some cases, instantiation might be based on instructions in the data additional to the application. In other cases, instantiation might be based on the instantiation instructions from the third computer (at optional block 430; if applicable). In some instances, instantiation might be in response to other external triggers or external events, or the like—including, without limitation, performance issues, emergency events, market activities, sensor triggers, and/or the like—in a manner similar to sending of the file being in response to an external event trigger. In some cases, the same external event trigger might cause both the sending of the file and the instantiation of the application, among other processes described herein. In other cases, different external event triggers might cause the separate processes of sending the file and instantiating the application (among other processes described herein). According to various embodiments, "compute surface" (as described above) might refer to any suitable hardware-based or virtual compute resource that may be located or hosted at the node, located in the network, located in a cloud computing environment, located at a customer premises gateway device, located in the second computer, and/or the like, and in some cases located at a virtual machine ("VM"), which might be located or hosted at one or more of these locations in the network. In some instances, the customer premises gateway might serve as a demarcation between a provider portion of the network and a customer portion of the network, and the compute surface might be located or hosted in the customer portion of the network.

According to some embodiments, the compute surface might be hosted on a VM that is hosted on a device on the customer side of the network (i.e., at the second computer). In some cases, the second computer could be a residential/business gateway that could have some LAN ports to support additional devices on the LAN. The communications to instantiate the application could be passed through the second computer to a device on the LAN. In some instances, some of these devices on the LAN could be wireless devices supported by a WiFi access point ("AP") or some other wireless technology.

In some embodiments, the compute surface may logically be distributed across multiple locations. In some cases, portions of the compute surface may be in both the customer network and the service provider network, and possibly also in a third party network that could be a content provider network, a service provider network, or another customer network, and/or the like. According to some embodiments, the compute surface may be located or hosted on multiple devices on the LAN side (i.e., customer portion of the network) to interact peer-to-peer or in a local mesh as in machine-to-machine communications, in some cases, in a manner as described in detail with respect to machine-to-machine communications via a network functions virtualization interconnection gateway ("NFVIG"), via a network functions virtualization interconnection hub ("NFVIH"), via customer environment network functions virtualization ("NFV"), as described in detail in the '208, '280, and '309 applications, which have already been incorporated herein by reference in their entirety. In some cases, the portion of the NFVs that reside in the network can maintain the responsibility of uniformly upgrading customer-side NFV applications. The customer-side portion of split NFVs may be designed such that their basic functions can continue (for at least a reasonable amount of time) in an autonomous fashion as would be necessary in a loss of connectivity with the network. If this "reasonable amount of time" happens to be indefinite, the various embodiments may operate in accordance with the embodiments as described in the '309 application. The devices simply need to receive the appropriate application instantiation to begin autonomous operation. The devices can "call home" (e.g., to the supplier of the device, to a service provider, or the like) for initial configuration, and then periodically check for updates (which in some cases, might be embedded or included in the application and/or data in the file being sent, as described above).

In some embodiments, the location of the instantiated instance of the application may be distributed over multiple compute surface locations. In some instances, the compute surface(s) on which the instance of the application is instantiated might correspond to the selected one or more compute surface locations (at optional block 425; if applicable). According to some embodiments, the compute surface might include, without limitation, one or more virtualized network functions ("VNFs") or might have running thereon the one or more VNFs, and the application might be mapped to the one or more VNFs (as shown, e.g., in FIG. 1).

Merely by way of example, in some aspects, method 400 might further comprise receiving, with the node, second data from at least one of the user, the first computer, or a separate third computer (not shown). The second data might be different from (and in some cases complementary or supplementary to) the data contained in the file. The method 400 might also comprise operating on the second data with the instance of the application (also not shown), in a manner similar to operating on the data with the instance of the application (at block 440).

With reference to FIG. 4B, the process of selecting one or more compute surface locations in the network to instantiate the instance of the application (at optional block 425) might comprise one of the following: (a) receiving user input from a sender of the file (i.e., user associated with the first computer) (optional block 445) and selecting a location in the network based at least in part on the user input from the sender (optional block 450); (b) receiving user input from a recipient (or intended recipient) of the file (i.e., user associated with the second computer) (optional block 455) and selecting a location in the network based at least in part on the user input from the recipient (optional block 460); (c) selecting (with the node and/or, in some cases, the third computer (if applicable)) a location in logical or physical proximity to the second computer (optional block 465); (d) selecting (with the node and/or, in some cases, the third computer (if applicable)) a location that is appropriate to maintain necessary performance attributes (including, but not limited to, jitter, delay, bandwidth, etc.) to support the application (optional block 470); and/or the like. Herein, "logical proximity" might refer to proximity based on data transfer logic, which is not necessarily the same as "physical proximity," which might refer to geographical proximity. According to some embodiments, selecting a location that is appropriate to maintain necessary performance attributes to support the application might include selecting a location in the network to instantiate the application to ensure that certain jitter and/or delay performance levels can be maintained. Alternatively, or additionally, selecting a location that is appropriate to maintain necessary performance attributes to support the application might include selecting a location in the network that facilitates efficient use of bandwidth resources such as in the case of video-based content or the like.

In some embodiments, the user input (either from the sender or from the (intended) recipient) might specify requirements for selecting a location in the network to instantiate the instance of the application. In some instances, requirements might be specified in a field of a specified format (including, but not limited to, topology and orchestration specification for cloud applications ("TOSCA") format, cloud service archive ("CSAR") format, and/or the like).

Exemplary System and Hardware Implementation

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of the computers or computing systems 105, 110, and 140, the nodes 120, the compute surfaces, 125, the virtual machines or VMs 205, the gateway devices 215, user devices or computing systems in communication with any of these devices, and/or the like, as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computers or computing systems 105, 110, and 140, the nodes 120, the compute surfaces, 125, the virtual machines 205, the gateway devices 215, user devices or computing systems in communication with any of these devices, or of any other device, as described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

As noted above, a set of embodiments comprises methods and systems for implementing remote application access. FIG. 6 illustrates a schematic diagram of a system 600 that can be used in accordance with one set of embodiments. The system 600 can include one or more user computers or user devices 605. A user computer or user device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 605 can also have any of a variety of applications, including one or more applications configured to perform methods provided by various embodiments (as described above, for example), as well as one or more office applications, database client and/or server applications, and/or web browser applications. Alternatively, a user computer or user device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers or user devices 605, any number of user computers or user devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 605 and/or another server 615. In some embodiments, an application server can perform one or more of the processes for implementing remote application access, or the like, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer or user device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer or user device 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise one or more nodes 625 and/or one or more compute surfaces 630, as described in detail above with respect to FIGS. 1-4. In some embodiments, one or more of the user device 605a, the user device 605b, the server 615a, the server 615b, the database 620a, and/or the database 620b might be in the same network 610 as one of the one or more nodes 625 or the one or more compute surfaces 630. In alternative or additional embodiments, one or more of the user device 605a, the user device 605b, the server 615a, the server 615b, the database 620a, and/or the database 620b might be in a first network 610 that is different from another network(s) 610 in which each of the one or more nodes 625 or the one or more compute surfaces 630 are located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
providing, with a first network, a connectivity between a first computer and a second network comprising a second computer;
transmitting, over the first network, a file from the first computer toward the second network comprising the second computer, the file comprising an application and data additional to the application;
selecting one or more compute surface locations in the second network to instantiate an instance of the application, wherein selecting the one or more compute surface locations in the second network to instantiate the instance of the application is based at least in part on a user input, wherein the user input specifies one or more requirements for selecting the one or more compute surface locations in the second network to instantiate the instance of the application;
receiving, with a node in a second network on a path between the first computer and the second computer, the file comprising the application;
determining, with the node in the second network, whether to intercept the file comprising the application, before the second computer can receive the file, wherein determining, with the node in the network, whether to intercept the file comprising the application, before the second computer can receive the file, comprises determining, with the node in the second network, whether the node is at least one of located at a same customer premises as the second computer or located in a same customer network as the second computer and determining, with the node in the second network, whether the node has the one or more requirements to instantiate the instance of the application;
based in part on a determination the node is at least one of located at the same customer premises as the second computer or located in the same customer network as the second computer and based in part on a determination that the node has the one or more requirements to instantiate the instance of the application, capturing, with the node in the network, the file containing the application and the data, before the second computer can receive the file;
instantiating the instance of the application that was captured with the node in the second network on a compute surface of the node in the second network as a service for the second computer, wherein the compute surface of the node in the second network comprises different hardware resources from the second computer, and wherein the second computer accesses the service via the compute surface of the node in the second network; and
operating on the data with the instance of the application.

2. The method of claim 1, wherein the compute surface comprises one or more virtualized network functions ("VNFs"), and wherein the application is mapped to the one or more VNFs.

3. The method of claim 1, wherein the compute surface is hosted on a virtual machine, wherein the virtual machine is hosted in a cloud environment.

4. The method of claim 1, wherein the second computer is a customer premises gateway that serves as a demarcation between a provider portion of the first network and a customer portion of the second network, and wherein the compute surface is located in the customer portion of the second network.

5. The method of claim 1, wherein selecting a location comprises selecting a location in logical proximity to the second computer.

6. The method of claim 1, further comprising:
receiving, with the node in the second network, second data from at least one of the user, the first computer, or a separate third computer, the second data being different from the data contained in the file; and
operating on the second data with the instance of the application.

7. The method of claim 1, wherein the second computer comprises a programmable hardware device, and wherein the application is a management application for the programmable hardware device.

8. The method of claim 7, wherein the programmable hardware comprises a software defined radio ("SDR") in the second network, and wherein the application is a radio management application for managing the SDR.

9. The method of claim 8, wherein the radio management application operates the SDR as one or more of an unlicensed spectrum access point on a subscriber network or a licensed spectrum access point on a provider network.

10. The method of claim 7, wherein the programmable hardware is capable of machine-to-machine communication, and wherein the application programs the programmable hardware to perform machine-to-machine communication.

11. The method of claim 1, wherein the application is a user application to be demonstrated by a user of the first computer for a user of the second computer, and wherein the second computer lacks sufficient resources to execute the application.

12. The method of claim 1, wherein transmitting the file comprises transmitting, over the first network, a file from the first computer toward a second computer in response to an external event trigger.

13. The method of claim 1, wherein determining that the file contains the application comprises detecting an identifier associated with the file.

14. The method of claim 13, wherein the file is transmitted in one or more packets over the first network, and wherein the identifier comprises a tag applied to at least one of the one or more packets.

15. The method of claim 13, wherein the file is transmitted in one or more packets over the first network, and wherein the identifier comprises a wrapper around at least some of the one or more packets.

16. An apparatus at a node in a first network that provides connectivity between a first computer located in a second network and a second computer located in the first network, wherein the node in the first network comprises different hardware resources from the first computer and the second computer, the apparatus comprising:
a non-transitory computer readable medium having encoded thereon a set of instructions executable by one or more computers to cause the apparatus to perform one or more operations, the set of instructions comprising:
instructions for selecting one or more compute surface locations in the second network to instantiate an instance of the application, wherein selecting the one or more compute surface locations in the second network to instantiate the instance of the application is based at least in part on a user input, wherein the user input specifies one or more requirements for selecting the one or more compute surface locations in the second network to instantiate the instance of the application;

instructions for receiving, with the node in the first network on a path between the first computer and the second computer, a file in transit from the first computer toward the second computer, the file comprising the application and data additional to the application;

instructions for determining, whether to intercept the file comprising the application, before the second computer can receive the file, wherein determining, whether to intercept the file comprising the application, before the second computer can receive the file, comprises determining, with the node in the second network, whether the node is at least one of located at a same customer premises as the second computer or located in a same customer network as the second computer and determining, with the node in the second network, whether the node has the one or more requirements to instantiate the instance of the application;

based in part on a determination the node is at least one of located at the same customer premises as the second computer or located in the same customer network as the second computer and based in part on a determination that the node has the one or more requirements to instantiate the instance of the application, instructions for capturing the file containing the application and the data, before the second computer can receive the file; and instructions for instantiating the instance of the application that was captured on a compute surface of the node in the second network as a service for the second computer, such that the compute surface of the node can operate on the data with the instance of the application, wherein the compute surface of the node in the first network comprises different hardware resources from the second computer, and wherein the second computer accesses the service via the compute surface of the node in the first network.

17. A computer system, comprising:

a first network that provides connectivity between a first computer located in the first network and a second computer located in the second network; and a node in the second network, on a path between the first computer and the second computer, wherein the node in the second network comprises different hardware resources from the first computer and the second computer, the node comprising: one or more processors; and a computer readable medium in communication with the one or more processors, the computer readable medium having encoded thereon a set of instructions executable by the one or more processors to cause the node to perform one or more operations, the set of instructions comprising:

instructions for selecting one or more compute surface locations in the second network to instantiate an instance of the application, wherein selecting the one or more compute surface locations in the second network to instantiate the instance of the application is based at least in part on a user input, wherein the user input specifies one or more requirements for selecting the one or more compute surface locations in the second network to instantiate the instance of the application;

instructions for receiving, with the node in the second network on the path between the first computer and the second computer, a file in transit from the first computer toward the second computer, the file comprising the application and data additional to the application;

instructions for determining, whether to intercept the file comprising the application, before the second computer can receive the file, wherein determining, whether to intercept the file comprising the application, before the second computer can receive the file, comprises determining, with the node in the second network, whether the node is at least one of located at a same customer premises as the second computer or located in a same customer network as the second computer and determining, with the node in the second network, whether the node has the one or more requirements to instantiate the instance of the application;

based in part on a determination the node is at least one of located at the same customer premises as the second computer or located in the same customer network as the second computer and based in part on a determination that the node has the one or more requirements to instantiate the instance of the application, instructions for capturing the file containing the application and the data, before the second computer can receive the file; and instructions for instantiating the instance of the application that was captured with the node in the second network on a compute surface of the node in the second network as a service for the second computer, such that the compute surface of the node can operate on the data with the instance of the application, wherein the compute surface of the node in the second network comprises different hardware resources from the second computer, and wherein the second computer accesses the service via the compute surface of the node in the first network.

* * * * *